United States Patent
Zhang et al.

(10) Patent No.: US 11,550,282 B2
(45) Date of Patent: Jan. 10, 2023

(54) CONTROL METHOD FOR SMART HOME DEVICE AND TERMINAL DEVICE

(71) Applicant: Gree Electric Appliances, Inc. of Zhuhai, Guangdong (CN)

(72) Inventors: Jiangshan Zhang, Guangdong (CN); Yuanzhao Wang, Guangdong (CN); Jin Shen, Guangdong (CN); Huizi Zhao, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 0 days.

(21) Appl. No.: 17/054,030

(22) PCT Filed: Dec. 14, 2018

(86) PCT No.: PCT/CN2018/121041
§ 371 (c)(1),
(2) Date: Nov. 9, 2020

(87) PCT Pub. No.: WO2020/015294
PCT Pub. Date: Jan. 23, 2020

(65) Prior Publication Data
US 2021/0232111 A1    Jul. 29, 2021

(30) Foreign Application Priority Data
Jul. 17, 2018    (CN) .......................... 201810783624.3

(51) Int. Cl.
*G05B 19/042*    (2006.01)

(52) U.S. Cl.
CPC .... *G05B 19/042* (2013.01); *G05B 2219/2642* (2013.01)

(58) Field of Classification Search
CPC ...................... G05B 19/042; G05B 2219/2642
(Continued)

(56) References Cited

U.S. PATENT DOCUMENTS

2012/0266095 A1* 10/2012 Killian .................... G06F 9/451
715/771
2016/0125880 A1* 5/2016 Zhang .................... G06F 3/167
704/275
(Continued)

FOREIGN PATENT DOCUMENTS

CN    103246267 A    8/2013
CN    104536397 A    4/2015
(Continued)

OTHER PUBLICATIONS

International Search Report, dated Mar. 21, 2019, in International application No. PCT/CN2018/121041, filed on Dec. 14, 2018.

*Primary Examiner* — Michael W Choi
(74) *Attorney, Agent, or Firm* — McAndrews, Held & Malloy, Ltd.

(57) ABSTRACT

Disclosed in the present disclosure are a control method for a smart home device and a terminal device. The control method comprises establishing a virtual usage scenario, wherein the virtual usage scenario comprises at least one virtual room, each of the at least one virtual room is bound to at least one virtual smart home device; acquiring a switching operation performed by a user for the virtual usage scenario, wherein the switching operation corresponds to a first virtual smart home device in the virtual usage scenario, and is used for switching the first virtual smart home device from a first virtual room where the first virtual smart home device is located to a second virtual room; and arranging the first virtual smart home device to the second virtual room according to the switching operation.

17 Claims, 3 Drawing Sheets

(58) Field of Classification Search
USPC .......................................................... 700/28
See application file for complete search history.

(56) References Cited

U.S. PATENT DOCUMENTS

| | | | |
|---|---|---|---|
| 2017/0315522 A1 | 11/2017 | Kwon et al. | |
| 2019/0004677 A1* | 1/2019 | Madonna | H05B 47/155 |
| 2019/0043260 A1* | 2/2019 | Anderson | G06F 3/011 |
| 2019/0250575 A1* | 8/2019 | Jonsson | G05B 19/042 |
| 2020/0371488 A1* | 11/2020 | Ackmann | G05B 19/0426 |

FOREIGN PATENT DOCUMENTS

| | | | | |
|---|---|---|---|---|
| CN | 105022281 A | * | 4/2015 | ............ G05B 15/02 |
| CN | 104699383 A | | 6/2015 | |
| CN | 104850106 A | | 8/2015 | |
| CN | 105022281 A | | 11/2015 | |
| CN | 105955042 A | | 9/2016 | |
| CN | 105955043 A | | 9/2016 | |
| CN | 106468993 A | | 3/2017 | |
| CN | 106681160 A | | 5/2017 | |
| CN | 106713082 A | | 5/2017 | |
| CN | 106961385 A | | 7/2017 | |
| CN | 107317822 A | | 11/2017 | |
| CN | 107705171 A | | 2/2018 | |
| CN | 107728483 A | | 2/2018 | |
| CN | 108983624 A | | 12/2018 | |
| CN | 108986821 A | | 12/2018 | |
| JP | 2005332352 A | | 12/2005 | |
| JP | 2015072602 A | | 4/2015 | |

\* cited by examiner

CONTROL METHOD FOR SMART HOME DEVICE AND TERMINAL DEVICE

The present disclosure is a 371 of International Patent Application No PCT/CN2018/121041, filed Dec. 14, 2018, which claims the priority of the Chinese patent disclosure No. 201810783624.3, filed to the Chinese Patent Office on Jul. 17, 2018 and entitled "Control Method for Smart Home Device and Terminal Device", which is incorporated herein by reference in its entirety.

TECHNICAL FIELD

The present disclosure relates to the technical field of smart home appliances, and in particular, to a control method for a smart home device and a terminal device.

BACKGROUND

Smart home devices are becoming more and more intelligentized, and bring great convenience to life of users. Current smart home devices mostly are integrated and matched through a terminal, and are displayed to users in the form of a menu and a sub-menu on an interface of the terminal. However, it looks disordered if a plurality of smart home devices are distributed on the display interface of a terminal device, and each type of the smart home devices, such as air conditioner, may involve a plurality of smart home devices. Thus when the air conditioner in a living room needs to be controlled, the air conditioner which is located in a bedroom and displayed on the display interface of the terminal device could potentially be selected, that is, an incorrect selection may be made.

Therefore, currently in the control of smart home devices, a smart home device may be incorrectly selected, and there is a high misoperation rate.

SUMMARY

According to a first aspect, a control method for a smart home device is provided, the control method includes:

establishing a virtual usage scenario, wherein the virtual usage scenario includes at least one virtual room, each of the at least one virtual room is bound to at least one virtual smart home device, and a real smart home device corresponding to each of the at least one virtual smart home device is arranged in a real room corresponding to each of the at least one virtual room;

acquiring a switching operation performed by a user for the virtual usage scenario, wherein the switching operation corresponds to a first virtual smart home device in the virtual usage scenario, and is used for switching the first virtual smart home device from a first virtual room where the first virtual smart home device is located to a second virtual room; and arranging the first virtual smart home device to the second virtual room according to the switching operation; wherein, in a case that the second virtual room is viewed, the first virtual smart home device is located in the second virtual room.

Optionally, voice information input by the user is detected, wherein the voice information includes name information of the first virtual smart home device and name information of the second virtual room to which the first virtual smart home device is to be bound; and the switching operation is executed according to the voice information.

Optionally, the voice information further includes:

placement position information of the first virtual smart home device in the second virtual room, such that the first virtual smart home device is arranged in a position indicated by the placement position information in the second virtual room.

Optionally, before acquiring the switching operation performed by the user for the virtual usage scenario, the control method further includes:

acquiring first attribute information of the first virtual smart home device, wherein the first attribute information is used for indicating whether it is allowed to re-bind a smart home device;

if it is determined that the first attribute information indicates that it is allowed to re-bind the first virtual smart home device, outputting an image of the second virtual room;

or, outputting an identifier of each of the at least one virtual room, wherein the identifier of each of the at least one virtual room includes an identifier of the second virtual room;

or, outputting a list of the at least one virtual room, wherein the second virtual room is included in the list.

Optionally, before acquiring the switching operation performed by the user for the virtual usage scenario, the control method further includes:

setting, according to a preset rule, the attribute information for each of the at least one virtual smart home device; wherein the preset rule includes a type of each of the at least one virtual smart home device, and/or a placement position of each of the at least one virtual smart home device in a room.

According to a second aspect, a terminal device is provided, the terminal device includes:

an establishment unit configured to establish a virtual usage scenario, wherein the virtual usage scenario includes at least one virtual room, each of the at least one virtual room is bound to at least one virtual smart home device, and a real smart home device corresponding to each of the at least one virtual smart home device is arranged in a real room corresponding to each of the at least one virtual room;

an acquisition unit configured to acquire a switching operation performed by a user for the virtual usage scenario, wherein the switching operation corresponds to a first virtual smart home device in the virtual usage scenario, and is used for switching the first virtual smart home device located in a first virtual room to a second virtual room; and a switching unit configured to arrange the first virtual smart home device to the second virtual room according to the switching operation; wherein, in a case that the second virtual room is viewed, the first virtual smart home device is located in the second virtual room.

Optionally, the acquisition unit is specifically configured to:

detect voice information input by the user, wherein the voice information includes name information of the first virtual smart home device and name information of the second virtual room to which the first virtual smart home device is to be bound; and execute the switching operation according to the voice information.

Optionally, the voice information further includes:

placement position information of the first virtual smart home device in the second virtual room, such that the first virtual smart home device is arranged in a position indicated by the placement position information in the second virtual room.

Optionally, the terminal device further includes an output unit;

wherein the acquisition unit is further configured to:

acquire first attribute information of the first virtual smart home device, wherein the first attribute information is used for indicating whether it is allowed to re-bind a smart home device;

the output unit is configured to: if it is determined that the first attribute information indicates that it is allowed to re-bind the first virtual smart home device, output an image of the second virtual room;

or, output an identifier of each of the at least one virtual room, wherein the identifier of each of the at least one virtual room includes an identifier of the second virtual room;

or, output a list of the at least one virtual room, wherein the second virtual room is included in the list.

Optionally, the terminal device further includes a setting unit configured to:

set, according to a preset rule, the attribute information for each of the at least one virtual smart home device; wherein the preset rule includes a type of each of the at least one virtual smart home device, and/or a placement position of each of the at least one virtual smart home device in a room.

For the technical effects of the terminal device provided in the embodiments of the present disclosure, reference can be made to the technical effects of various implementations according to the first aspect, and details are not repeatedly described herein.

According to a third aspect, a terminal device is provided, the terminal device comprising:

at least one processor, and a memory connected to the at least one processor;

wherein the memory stores an instruction that is executed by the at least one processor, and the at least one processor implements the method according to any of the described above according to the first aspect by executing the instruction stored in the memory.

According to a fourth aspect, a computer storage medium is provided, on which a computer program is stored, and the computer program is executed by a processor to implement the method according to any of the described above according to the first aspect.

DETAILED DESCRIPTION OF THE EMBODIMENTS

In order to make the objective, the technical solutions and the advantages of the present disclosure more clear, the technical solutions in the embodiments of the present disclosure will be described below in a clear and complete way with reference to the drawings in the embodiments of the present disclosure.

Currently in the control of smart home devices, a smart home device to be controlled may be incorrectly selected, and there is a high misoperation rate.

In view of this, the embodiments of the present disclosure provide a control method for a smart home device. In the method, each of the at least one virtual room is bound to at least one virtual smart home device, and a real smart home device corresponding to each of the at least one virtual smart home device is arranged in a real room corresponding to each of the at least one virtual room. If a smart home device in a second room needs to be controlled, the second virtual room may be accessed first, and then the smart home device to be controlled is selected in the second virtual room. Even if there are smart home devices of the same type, the smart home device in the other room would not be selected, thereby reducing the misoperation rate.

The technical solutions provided in the embodiments of the present disclosure are described below with reference to the drawings.

Please refer to FIG. 1, the embodiments of the present disclosure provide a control method for a smart home device, the control method may be applied to a terminal device, and the specific flow of the control method is described as follows.

In step S101, a virtual usage scenario is established.

The embodiments of the present disclosure aim to manage smart home devices in a unified manner, and considering that in practical disclosures, a user may want to create a suitable environment for a certain room, for example, the user may want to control, for a bedroom, a plurality of smart home devices in the bedroom in a unified manner, such that the environment of the bedroom meets the requirements of an environment actually desired by the user. As another example, if the user wants the environment in a kitchen to have a desired effect, the user may adjust, for the kitchen, a plurality of smart home devices in the kitchen to control. Currently the smart home devices mostly are managed in a united manner through connections through a terminal, and the terminal enables the unified management. In a terminal interface, smart home devices are displayed to a user in the form of a menu and a sub-menu, such that the user can select the smart home device to be controlled. However, it looks disordered if a plurality of smart home devices are distributed on the display interface of a terminal, and each type of the smart home devices, such as air conditioner, may involve a plurality of smart home devices. Thus when the air conditioner in a living room needs to be controlled, the air conditioner which is located in a bedroom and displayed on the display interface of the terminal device could potentially be selected, that is, an incorrect selection may be made.

In order to manage the smart home devices in a united manner, according to the embodiments of the present disclosure, each of the smart home devices may be bound to a position of a room in which each of the smart home devices is actually located, for example, air conditioner A is in bedroom 1, television B is in bedroom 1, and air conditioner C is in bedroom 2, thus a user may implement a control task for each room.

In some implementations, according to the embodiments of the present disclosure, a virtual usage scenario may be established. The virtual usage scenario may include at least one virtual room, each of the at least one virtual room is bound to at least one virtual smart home device, and a real smart home device corresponding to each of the at least one virtual smart home device is arranged in a real room corresponding to each of the at least one virtual room. Wherein the virtual usage scenario may be a home virtual usage scenario, and may also be a hotel virtual usage scenario, or other possible usage scenarios. For example, if the virtual usage scenario is a home virtual usage scenario, the virtual usage scenario may include a virtual living room, a virtual bedroom, a virtual kitchen, a virtual rest room, etc. For the virtual living room, a virtual television, a virtual air conditioner, a virtual water dispenser, etc., may be bound, and for the virtual kitchen, a virtual kitchen ventilator, a virtual air purifier, a virtual water heater, etc., may be bound, and more examples will not be given herein one by one. Each of the at least one virtual smart home device may correspond to a smart home device actually deployed in the usage scenario. Alternatively, for example, if the virtual usage scenario is a hotel virtual usage scenario, the virtual usage scenario may include a plurality of hotel virtual rooms, and for each of the hotel virtual rooms, a virtual television, a virtual air conditioner, a virtual water dispenser, etc., may be bound. In this way, a hotel administrator is able to perform unified control and management of hotel rooms, which is more efficient and convenient.

Figure 2:
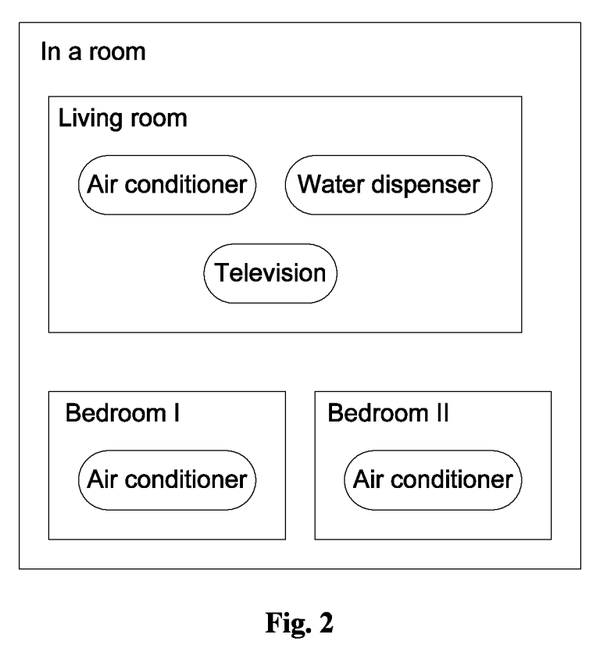
FIG. 2 is a schematic diagram of virtual usage scenarios provided in the embodiments of the present disclosure.

If a smart home device is bound to a room, on the display interface of a terminal device, a virtual smart home device corresponding to the smart home device is located in a virtual room corresponding to the room. For ease of understanding, please refer to FIG. 2, FIG. 2 shows a possible display picture. In this picture, three virtual rooms are displayed, namely virtual living room, virtual bedroom I and virtual bedroom II. A virtual television and a virtual air conditioner are displayed in the virtual living room, a virtual air conditioner is displayed in virtual bedroom I, and a virtual air conditioner is displayed in virtual bedroom II. FIG. 2 is only a schematic diagram, and the display forms of virtual smart home devices and virtual rooms are not limited in the embodiments of the present disclosure. For example, in some possible implementations, a virtual room may be a three-dimensional image corresponding to a real room, thus a more intuitive image is presented to the user, thereby facilitating the user intuitively controlling the smart home device on the basis of a visual sense, providing better user experience.

In the embodiments of the present disclosure, after a virtual usage scenario is established, a virtual smart home device may be bound to a virtual room, so as to establish a binding relationship between a real smart home device and a real room. However, in practice, a smart home device in a certain room may need to be replaced, in this case the user needs to perform an unbinding operation on the binding relationship between the smart home device and the room through the terminal device, and then perform a binding operation for the room and the replaced smart home device, the operations are complex, and therefore the efficiency of binding the smart home device to the room is low.

In view of this, in step S102, according to the embodiments of the present disclosure, a switching operation performed by a user for the virtual usage scenario may be acquired, wherein the switching operation corresponds to a first virtual smart home device, and is used for switching the first virtual smart home device located in a first virtual room to a second virtual room. Of course, the initial position of the first virtual smart home device may also not be located in the first virtual room, in other words, the first virtual smart home device is not bound to any room. Moreover, in step S103, according to the embodiments of the present disclosure, the first virtual smart home device may be arranged in the second virtual room according to the switching operation, so as to indicate that there is a binding relationship between a first smart home device and a second room. In this way, when the user views the second virtual room, the first virtual smart home device is located in the second virtual room, thus the user can be aware that there is a binding relationship between the first smart home device and the second room.

Since the switching operation can be used for switching the first virtual smart home device located in the first virtual room to the second virtual room, compared with the method known to the inventors of performing an unbinding operation on a binding relationship between a smart home device and a room, and then performing a binding operation for the room and the new smart home device, that is two operations, in the embodiments of the present disclosure, merely one operation, the switching operation, is needed to bind the smart home device to the room, simplifying the operation, thereby improving the switching efficiency.

In some implementations, the switching operation may include a voice operation, wherein voice information carried in the voice operation may include name information of the first virtual smart home device and name information of the second virtual room to which the first virtual smart home device is to be bound. For example, "switch the first virtual smart home device to the second virtual room", further reducing the operation complexity compared with other manual operations.

Furthermore, the voice operation may also realize the switching of the first virtual smart home device to a designated position in the second virtual room only if the corresponding voice information includes the placement position information of the first virtual smart home device in the second virtual room, for example, a voice "switch the first virtual smart home device to a position close to the wardrobe in the second virtual room" may be input, thereby meeting the usage requirements of users. Compared with manual operations, such as a sliding operation, since the manual operations relate to a position estimated by a user himself, the embodiments of the present disclosure can more accurately switch the first virtual smart home device to the designated position in the second virtual room.

In some implementations, the voice information input by the user may include name information of two smart home devices and name information of one virtual room. For example, a user may input "switch the first virtual smart home device and the second virtual smart home device to the second virtual room". In this way, the user can bind two smart home devices merely by performing an input operation once. Alternatively, the voice information input by the user may include name information of two smart home devices and name information of two virtual rooms. For example, a user may input "switch the first virtual smart home device to the second virtual room, and switch the second virtual smart home device to the third virtual room". In this way, the user can bind two smart home devices to different rooms respectively merely by performing an input operation once, without the need of multiple times of operations, simplifying the operation, and improving the binding efficiency.

Some smart home devices, such as kitchen ventilator, are usually located in a kitchen, in general, the positions of the kitchen ventilator will not be changed. If the user selects a virtual kitchen ventilator corresponding to the kitchen ventilator when executing the switching operation, on the basis of the fact that the position of the kitchen ventilator in general is rarely changed, it is considered that the user may make a misoperation at this time, that is, the user may access an incorrect room or select an incorrect smart home device, in this case, the terminal device may not respond to the switching operation performed by the user, so as to avoid misoperation as far as possible.

In some implementations, before acquiring the switching operation performed by the user for the first virtual smart home device in the virtual usage scenario, the terminal device in the embodiments of the present disclosure may acquire first attribute information of the first virtual smart home device. Wherein the first attribute information can be used for indicating whether it is allowed to re-bind a smart home device, that is whether it is allowed to switch the room. After acquiring the first attribute information, only when the terminal device determines that the first attribute information indicates that it is allowed to re-bind the first virtual smart home device, the terminal device outputs a virtual room to which the first virtual smart home device may be bound.

In some implementations, the terminal device outputting the virtual room to which the first virtual smart home device may be bound may be implemented in the following three manners:

According to a first manner, the terminal device may directly output an image of the second virtual room, so as to inform a user that a first virtual smart home device can be directly dragged into the image of the second virtual room, thereby realizing re-binding of the first smart home device.

According to a second manner, the terminal device may output an identifier of each of the at least one virtual room, so as to inform a user of a room to which a first virtual smart home device may be bound, such that the user may select an identifier of the second virtual room from the identifier of each of the at least one virtual room. The terminal device may output the image of the second virtual room, and the user may directly drag the first virtual smart home device into the image of the second virtual room, thereby realizing re-binding of the first smart home device.

According to a third manner, a terminal device may output a list of at least one virtual room, so as to inform a user of at least one room to which the first virtual smart home device may be bound, such that the user may select the second virtual room from the list of the at least one virtual room. The terminal device may output the image of the second virtual room, and the user may directly drag the first virtual smart home device into the image of the second virtual room, thereby realizing re-binding of the first smart home device.

If the virtual usage scenario is still the hotel virtual usage scenario, the hotel rooms may be classified into a VIP suite, a luxury suite, or a junior suite, etc. It is possible that it is not allowed to bind the smart home device in the VIP suite, or the VIP suite is managed separately, and in this case, it is not allowed to bind the virtual room corresponding to the VIP suite. In some implementations, the terminal device in the embodiments of the present disclosure considers whether it is allowed to bind the smart home device to another room, for example, the air conditioner may be bound to bedroom I, and it may also be allowed to bind to bedroom II. Moreover, the terminal device may also consider whether the rooms are allowed to be bound, for example, bedroom II is not allowed to be bound to an air conditioner. In this case, if the user wants to bind the air conditioner, the terminal device only outputs a virtual room corresponding to bedroom I according to the air conditioner selected by the user.

In some implementations, considering whether a smart home device can be switched to another room may be related to the function implemented by the smart home device and the effect of the another room, and may also be related to the position where the smart home device is placed. Therefore, before acquiring the switching operation performed by the user for the first virtual smart home device in the virtual usage scenario, the terminal device in the embodiments of the present disclosure may further set, according to a preset rule, attribute information for each of the at least one virtual smart home device.

The preset rule may include a type of each of the at least one virtual smart home device, for example, whether the smart home device is an air conditioner, a television, or a kitchen ventilator, etc. If it is a kitchen ventilator, the kitchen ventilator usually is placed in a kitchen, and thus it is not allowed to bind to a living room or bedroom. The preset rule may also include a placement position of each of the at least one virtual smart home device in a room. For example, a water heater generally is bound to a position within a room closer to a water pipe, if the water heater is to be switched to the other room to a position farther from the water pipe, it is not allowed to bind the water heater to the other room.

In summary, in the embodiments of the present disclosure, each of the at least one virtual room is bound to at least one virtual smart home device, and a real smart home device corresponding to each of the at least one virtual smart home device is arranged in a real room corresponding to each virtual room. If a smart home device in a second room needs to be controlled, the second virtual room may be accessed first, and then the smart home device to be controlled is selected in the second virtual room. After the room is changed, the binding relationship between the room and the smart home device is updated in time, and if the smart home device in a first room needs to be controlled, even if there are smart home devices of the same type, the smart home device in the other room would not be selected, thereby reducing the misoperation rate.

Since the switching operation can be used for switching the first virtual smart home device located in the first virtual room to the second virtual room, compared with the method known to the inventors of performing an unbinding operation on a binding relationship between a smart home device and a room, and then performing a binding operation for the room and the new smart home device, that is the two operations, in the embodiments of the present disclosure, merely one operation, the switching operation, is needed to bind the smart home device to the room, simplifying the operation, thereby improving the switching efficiency.

A device provided in the embodiments of the present disclosure is described below with reference to the drawings.

Figure 3:
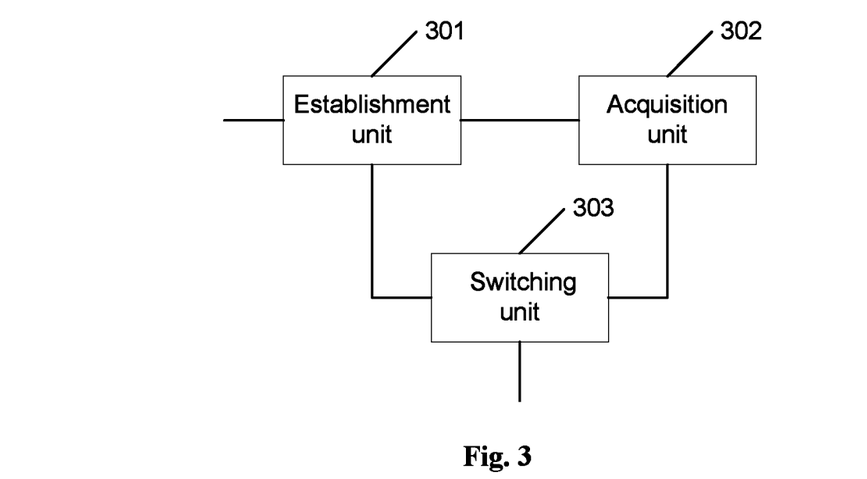
FIG. 3 is a schematic diagram of a terminal device provided in the embodiments of the present disclosure.

Please refer to FIG. 4, on the basis of the same inventive concept, some embodiments of the present disclosure provides a terminal device, wherein the terminal device may be a mobile phone, a tablet, etc. The terminal device may include an establishment unit 301, an acquisition unit 302, and a switching unit 303. Wherein an establishment unit 301 is configured to establish a virtual usage scenario, wherein the virtual usage scenario includes at least one virtual room, each of the at least one virtual room is bound to at least one virtual smart home device, and a real smart home device corresponding to each of the at least one virtual smart home device is arranged in a real room corresponding to each of the at least one virtual room. An acquisition unit 302 is configured to acquire a switching operation performed by a user for the virtual usage scenario, wherein the switching operation corresponds to a first virtual smart home device, and is used for switching the first virtual smart home device located in a first virtual room to a second virtual room. A switching unit 303 is configured to arrange the first virtual smart home device to the second virtual room according to the switching operation; wherein, in a case that the second virtual room is viewed, the first virtual smart home device is located in the second virtual room.

Optionally, the acquisition unit 302 is specifically configured to:

detect voice information input by the user, wherein the voice information includes name information of the first virtual smart home device and name information of the second virtual room to which the first virtual smart home device is to be bound; and execute the switching operation according to the voice information.

Optionally, the voice information further includes:

placement position information of the first virtual smart home device in the second virtual room, such that the first virtual smart home device is arranged in a position indicated by the placement position information in the second virtual room.

Optionally, the terminal device further includes an output unit;

wherein the acquisition unit 302 is further configured to:

acquire first attribute information of the first virtual smart home device, wherein the first attribute information is used for indicating whether it is allowed to re-bind a smart home device;

the output unit is configured to: if it is determined that the first attribute information indicates that it is allowed to re-bind the first virtual smart home device, output an image of the second virtual room;

or, output an identifier of each of the at least one virtual room, wherein the identifier of each of the at least one virtual room includes an identifier of the second virtual room;

or, output a list of the at least one virtual room, wherein the second virtual room is included in the list.

Optionally, the terminal device further includes a setting unit configured to:

set, according to a preset rule, the attribute information for each of the at least one virtual smart home device; Wherein the preset rule includes a type of each of the at least one virtual smart home device, and/or a placement position of each of the at least one virtual smart home device in a room.

Figure 4:
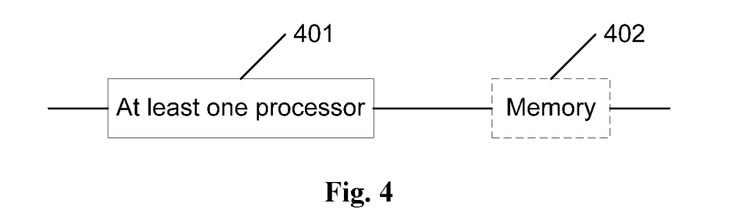
FIG. 4 is a schematic diagram of a terminal device provided in the embodiments of the present disclosure.

Please refer to FIG. 4, on the basis of the same inventive concept, some embodiments of the present disclosure provides a terminal device, wherein the terminal device may be a mobile phone, a tablet, etc. The terminal device may include: at least one processor 401, and the processor 401 is configured to implement steps of a control method for a smart home device provided in the embodiments of the present disclosure when executing a computer program stored in a memory.

Optionally, the processor 401 may specifically be a central processing unit or an Application Specific Integrated Circuit (ASIC), and may be one or more integrated circuits for controlling program execution.

Optionally, the terminal device further includes a memory 402 connected to at least one processor, and the memory 402 may include a Read-Only Memory (ROM), a Random Access Memory (RAM), and a disk memory. The memory 402 is configured to store data required when the processor 401 runs, that is, store an instruction that can be executed by the at least one processor 401. The at least one processor 401 executes the method shown in FIG. 1 by executing the instruction stored in the memory 402, wherein the number of memories 402 is one or more. The memory 402 is shown in FIG. 4, but it needs to be known that the memory 402 is not a necessary functional module, and therefore is shown by a dashed line in FIG. 4.

Wherein the physical devices corresponding to the establishment unit 301, the acquisition unit 302, and the switching unit 303 may be the processor 401 described above. The terminal device may be configured to execute the method provided in the embodiments shown in FIG. 1. Therefore, for the functions that can be implemented by the functional modules in the device, reference can be made to the corresponding disclosure in the embodiments shown in FIG. 1, and details are not repeatedly described herein.

Figure 1:
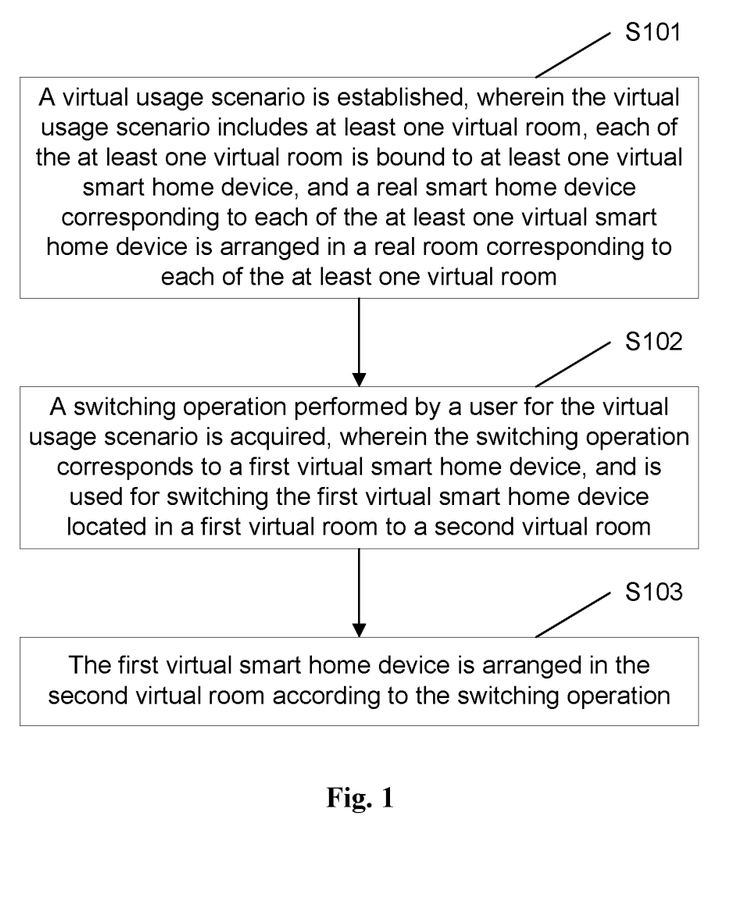
FIG. 1 is a flowchart of a control method for a smart home device provided in the embodiments of the present disclosure.

The embodiments of the present disclosure further provide a computer storage medium, wherein the computer storage medium stores a computer instruction, and, when the computer instruction is running on a computer, the computer executes the method as shown in FIG. 1.

It can be clearly understood by a person skilled in the art that, for convenience and brevity of description, division of the foregoing functional modules is only used as an example for description. In actual disclosures, the foregoing functions may be allocated to different functional modules for implementations according to the requirements, that is, an internal structure of a device is divided into different functional modules to implement some of the foregoing functions. For specific working processes of the foregoing system, device and units, reference may be made to the corresponding process in the foregoing method embodiments, and details are not repeatedly described herein.

In some of the embodiments provided in the present disclosure, it should be understood that the disclosed device and method may be implemented in other manners. For example, the device embodiments described above are merely illustrative. For example, the division of modules or units is merely a logical function division. In actual implementations, there may be another division manner, for example, a plurality of units or components may be combined, or can be integrated into another system, or some features can be ignored or not executed. In addition, the coupling or direct coupling or communication connection shown or discussed may be an indirect coupling or communication connection through some interfaces, apparatuses or units, and may be electrical, mechanical or otherwise.

The units described as separate components may or may not be physically separated, and the components displayed as units may or may not be physical units or modules, that is, may be located in one place, or may be distributed to a plurality of network units. Some of the units may be selected according to actual needs to achieve the objective of the solutions of the embodiments.

In addition, the functional units in respective embodiments of the present disclosure may be integrated in one processing unit, or the units can be physically and individually present, or two or more units are integrated in one unit. The integrated unit above may be implemented in the form of hardware, and may also be implemented in the form of a software functional unit.

The integrated unit, if implemented in the form of a software functional unit and sold or used as an independent product, may be stored in a computer readable storage medium. On the basis of such understanding, the portion of the technical solution of the present disclosure that contributes in essence or to the method known to the inventors or part of the technical solution may be embodied in the form of a software product, the computer software product is stored in a storage medium, and includes several instructions to cause a computer device (which may be a personal computer, server or network device, etc.) or a processor to perform some the steps of the method according to the embodiments of the present disclosure. The foregoing storage medium includes: any medium that can store program code, such as a universal serial busflash disk, a mobile hard disk, a Read-Only Memory (ROM), a Random Access Memory (RAM), a diskette, or an optical disk.

Obviously, a person skilled in the art may make various modifications and variations to the present disclosure without departing from the spirit and scope of the present disclosure. As such, if these modifications and variations to the present disclosure belong to the scope of the claims of the present disclosure and their equivalents, the present disclosure is intended to include these modifications and variations.

What is claimed is:

1. A control method for a smart home device, comprising:
   establishing a virtual usage scenario, wherein the virtual usage scenario comprises a plurality of virtual rooms, each of the plurality of virtual rooms is bound to at least one virtual smart home device, and a real smart home device corresponding to each of the at least one virtual smart home device is arranged in a real room corresponding to the each of the plurality of virtual rooms;
   acquiring a switching operation performed by a user for the virtual usage scenario, wherein the switching operation corresponds to a first virtual smart home device in the virtual usage scenario, and is used for switching the first virtual smart home device from a first virtual room where the first virtual smart home device is located to a second virtual room, the switching operation is used for replacing the binding relationship between the real smart home device corresponding to the first virtual smart home device and the real room corresponding to the first virtual room, replacing the binding relationship is used for indicating a physical location of the real smart home device corresponding to the first virtual smart home device changes from the real room corresponding to the first virtual room to the real room corresponding to the second virtual room, before acquiring the switching operation, in a case that the first virtual room is viewed, the first virtual smart home device is located in the first virtual room and in a case that the second virtual room is viewed, the first virtual smart home device is not located in the second virtual room; and
   arranging the first virtual smart home device to the second virtual room according to the switching operation, wherein, in a case that the second virtual room is viewed, the first virtual smart home device is located in the second virtual room, and in a case that the first virtual room is viewed, the first virtual smart home device is not located in the first virtual room.

2. The method according to claim 1, wherein acquiring the switching operation performed by the user for the virtual usage scenario comprises:
   detecting voice information input by the user, wherein the voice information comprises name information of the first virtual smart home device and name information of the second virtual room to which the first virtual smart home device is to be bound; and
   executing the switching operation according to the voice information.

3. The method according to claim 2, wherein the voice information further comprises:
   placement position information of the first virtual smart home device in the second virtual room, such that the first virtual smart home device is arranged in a position indicated by the placement position information in the second virtual room.

4. The method according to claim 1, wherein before acquiring the switching operation performed by the user for the virtual usage scenario, the method further comprising:
   acquiring first attribute information of the first virtual smart home device, wherein the first attribute information is used for indicating whether it is allowed to re-bind the first virtual smart home device; and
   if it is determined that the first attribute information indicates that it is allowed to re-bind the first virtual smart home device,
   outputting an image of the second virtual room;
   or,
   outputting an identifier of the each of the plurality of virtual rooms, wherein the identifier of the each of the plurality of virtual rooms comprises an identifier of the second virtual room;
   or,
   outputting a list of the plurality of virtual rooms, wherein the second virtual room is included in the list.

5. The method according to claim 4, wherein before acquiring the switching operation performed by the user for the virtual usage scenario, further comprising:
   setting, according to a preset rule, an attribute information for the each of the at least one virtual smart home device; wherein the preset rule comprises a type of the each of the at least one virtual smart home device.

6. The method according to claim 4, wherein before acquiring the switching operation performed by the user for the virtual usage scenario, further comprising:
   setting, according to a preset rule, an attribute information for the each of the at least one virtual smart home device; wherein the preset rule comprises a placement position of the each of the at least one virtual smart home device in a room.

7. The method according to claim 4, wherein before acquiring the switching operation performed by the user for the virtual usage scenario, further comprising:
   setting, according to a preset rule, an attribute information for the each of the at least one virtual smart home device; wherein the preset rule comprises a type of the each of the at least one virtual smart home device, and a placement position of the each of the at least one virtual smart home device in a room.

8. The method according to claim 1, wherein the each of the plurality of virtual rooms is a three-dimensional image corresponding to the real room.

9. A terminal device, comprising:
   at least one processor, and
   a memory connected to the at least one processor;
   wherein the memory stores an instruction that is executed by the at least one processor, and the at least one processor implements the method according to claim 1 by executing the instruction stored in the memory.

10. A terminal device, comprising:
    an establishment processor configured to establish a virtual usage scenario, wherein the virtual usage scenario comprises a plurality of virtual rooms, each of the plurality of virtual rooms is bound to at least one virtual smart home device, and a real smart home device corresponding to each of the at least one virtual smart home device is arranged in a real room corresponding to the each of the plurality of virtual rooms;
    an acquisition processor configured to acquire a switching operation performed by a user for the virtual usage scenario, wherein the switching operation corresponds to a first virtual smart home device in the virtual usage scenario, and is used for switching the first virtual smart home device located in a first virtual room to a second virtual room, the switching operation is used for replacing the binding relationship between the real smart home device corresponding to the first virtual smart home device and the real room corresponding to the first virtual room, replacing the binding relationship is used for indicating a physical location of the real smart home device corresponding to the first virtual smart home device changes from the real room corresponding to the first virtual room to the real room corresponding to the second virtual room, before acquiring the switching operation, in a case that the first virtual room is viewed, the first virtual smart home device is located in the first virtual room and in a case that the second virtual room is viewed, the first virtual smart home device is not located in the second virtual room; and a switching processor configured to arrange the first virtual smart home device to the second virtual room according to the switching operation, wherein, in a case that the second virtual room is viewed, the first virtual smart home device is located in the second virtual room, and in a case that the first virtual room is viewed, the first virtual smart home device is not located in the first virtual room.

11. The terminal device according to claim 10, wherein the acquisition processor is specifically configured to:

detect voice information input by the user, wherein the voice information comprises name information of the first virtual smart home device and name information of the second virtual room to which the first virtual smart home device is to be bound; and execute the switching operation according to the voice information.

12. The method according to claim 11, wherein the voice information further comprises:

placement position information of the first virtual smart home device in the second virtual room, such that the first virtual smart home device is arranged in a position indicated by the placement position information in the second virtual room.

13. The terminal device according to claim 10, the terminal device further comprises an output processor;

wherein the acquisition processor is further configured to:
acquire first attribute information of the first virtual smart home device, wherein the first attribute information is used for indicating whether it is allowed to re-bind a smart home device;

the output processor is configured to: if it is determined that the first attribute information indicates that it is allowed to re-bind the first virtual smart home device, output an image of the second virtual room;

or, output an identifier of the each of the plurality of virtual rooms, wherein the identifier of the each of the plurality of virtual rooms comprises an identifier of the second virtual room;

or, output a list of the plurality of virtual rooms, wherein the second virtual room is included in the list.

14. The method according to claim 13, the terminal device further comprises a setting processor configured to:

set, according to a preset rule, an attribute information for the each of the at least one virtual smart home device; wherein the preset rule comprises a type of the each of the at least one virtual smart home device.

15. The method according to claim 13, the terminal device further comprises a setting processor configured to:

set, according to a preset rule, an attribute information for the each of the at least one virtual smart home device; wherein the preset rule comprises a placement position of the each of the at least one virtual smart home device in a room.

16. The method according to claim 13, the terminal device further comprises a setting processor configured to:

set, according to a preset rule, an attribute information for the each of the at least one virtual smart home device; wherein the preset rule comprises a type of the each of the at least one virtual smart home device, and a placement position of the each of the at least one virtual smart home device in a room.

17. The method according to claim 10, wherein the each of the plurality of virtual rooms is a three-dimensional image corresponding to the real room.

* * * * *